F. E. RICKARD AND D. R. ROBINSON.
SEALING MACHINE.
APPLICATION FILED JUNE 27, 1921.

1,435,334.

Patented Nov. 14, 1922.
9 SHEETS—SHEET 1.

INVENTOR
F. E. Rickard
D. R. Robinson
BY
Munn & Co.
ATTORNEYS

F. E. RICKARD AND D. R. ROBINSON.
SEALING MACHINE.
APPLICATION FILED JUNE 27, 1921.

1,435,334.

Patented Nov. 14, 1922.

INVENTOR
F. E. Rickard
D. R. Robinson
BY
ATTORNEYS

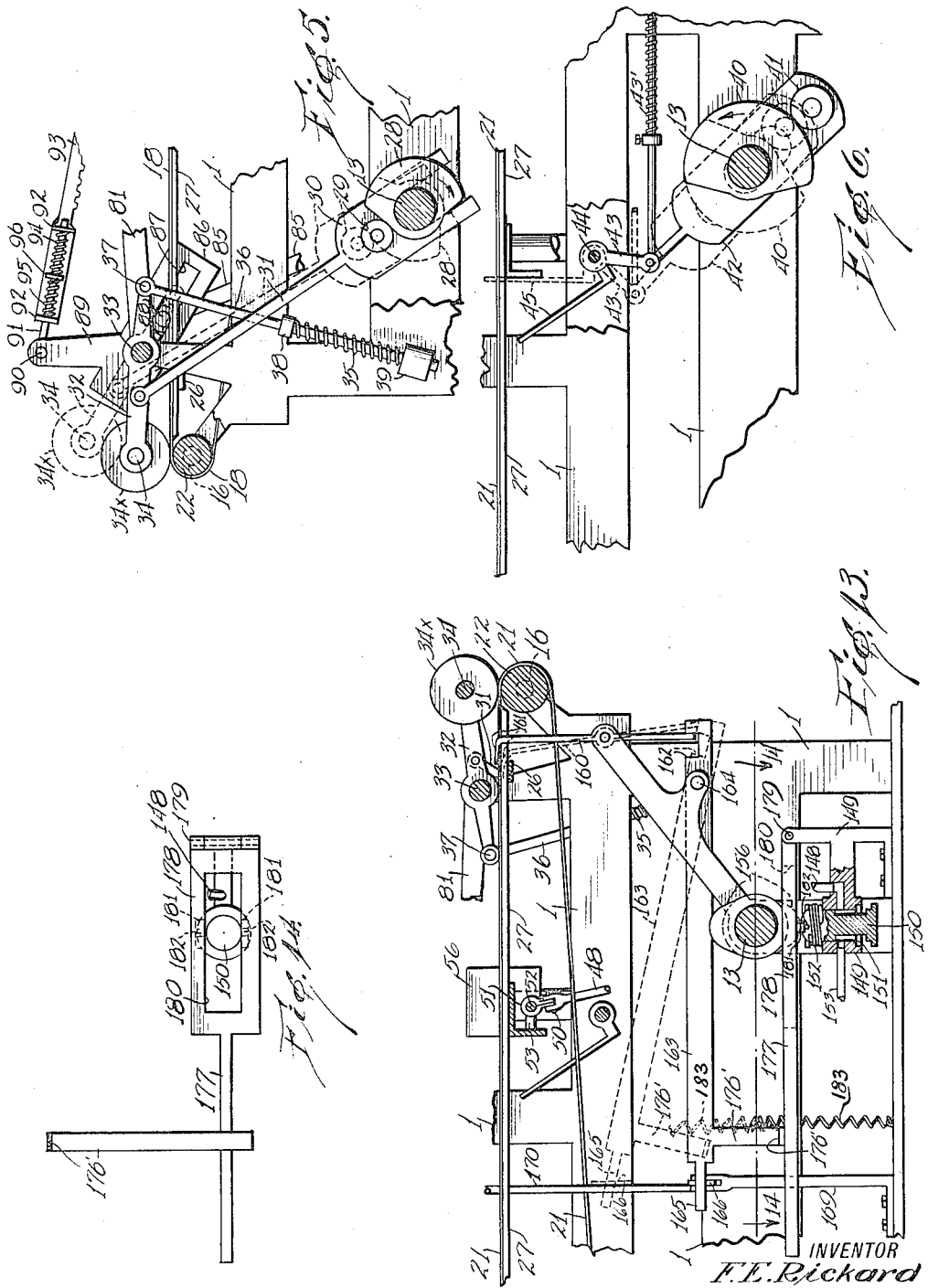

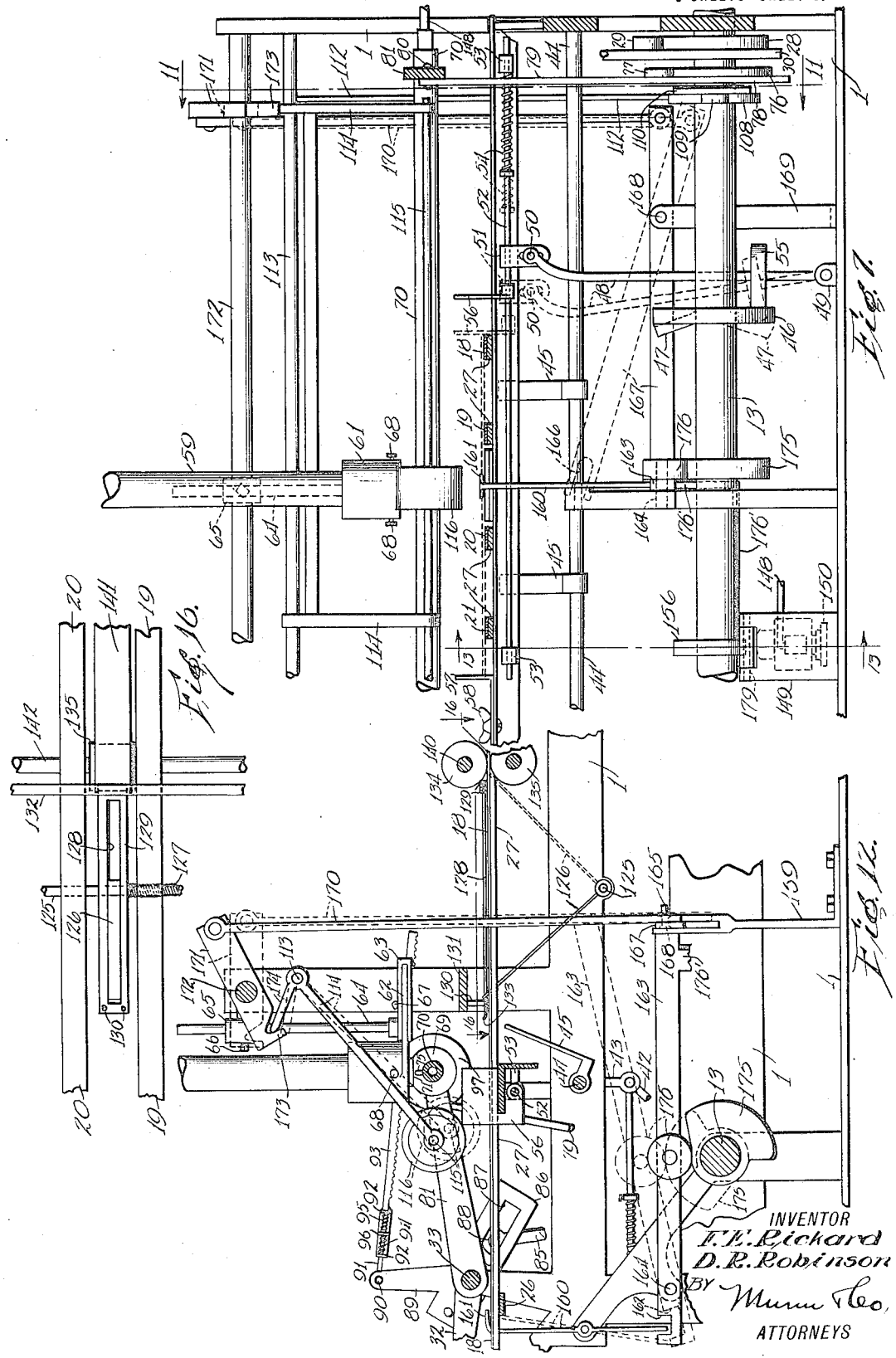

F. E. RICKARD AND D. R. ROBINSON.
SEALING MACHINE.
APPLICATION FILED JUNE 27, 1921.

1,435,334.

Patented Nov. 14, 1922.

INVENTOR
F. E. Rickard
D. R. Robinson
BY Munn & Co.
ATTORNEYS

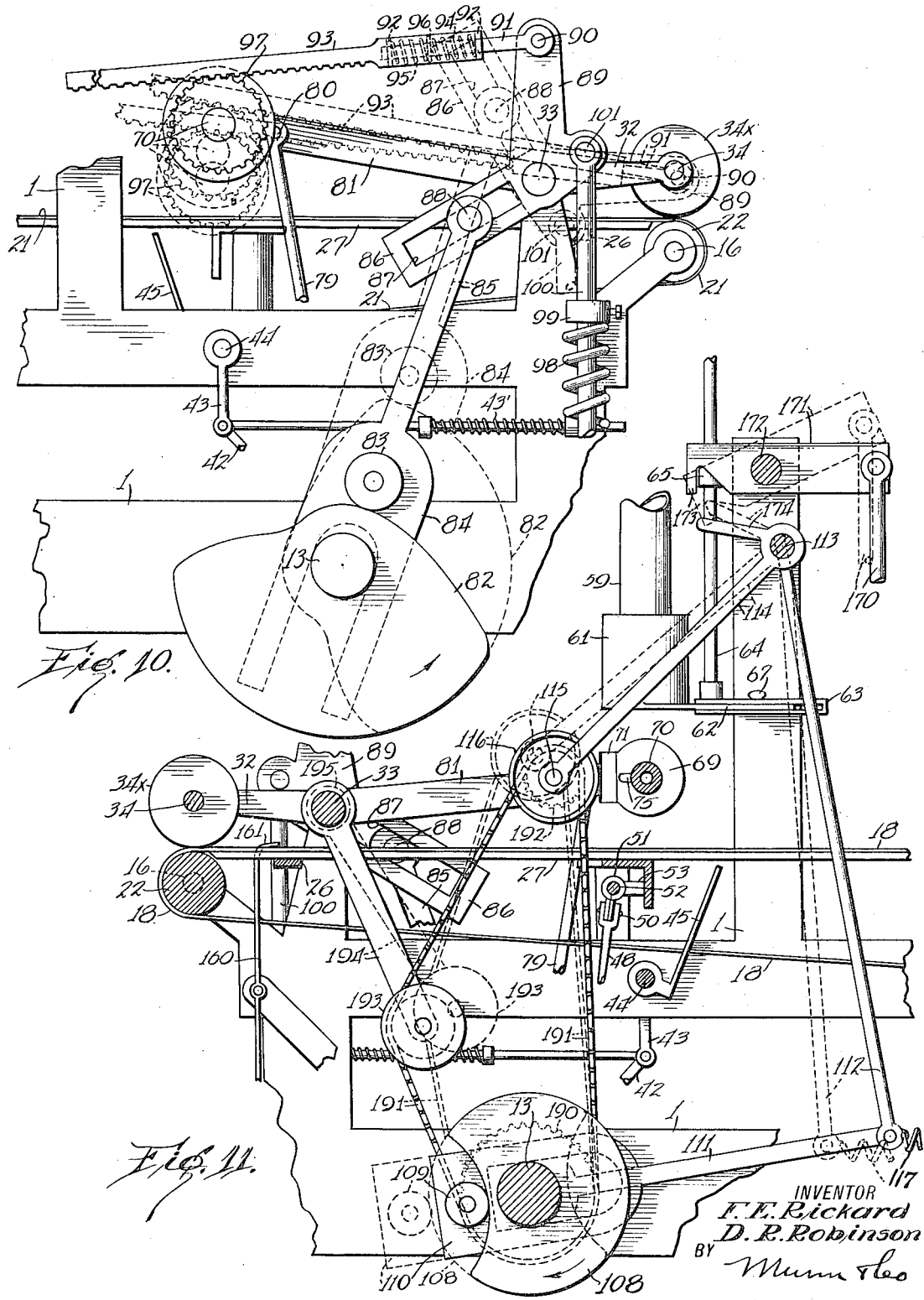

F. E. RICKARD AND D. R. ROBINSON.
SEALING MACHINE.
APPLICATION FILED JUNE 27, 1921.
1,435,334.
Patented Nov. 14, 1922.
9 SHEETS—SHEET 9.
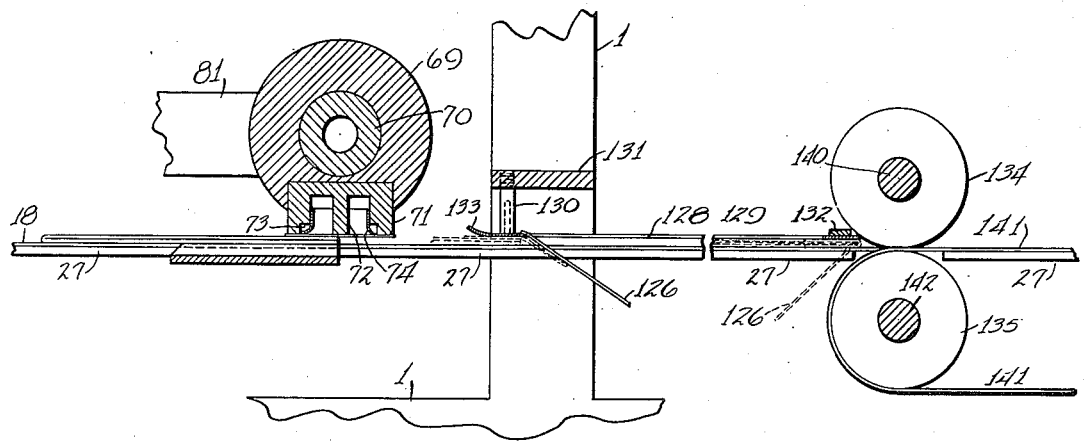
Fig. 17.
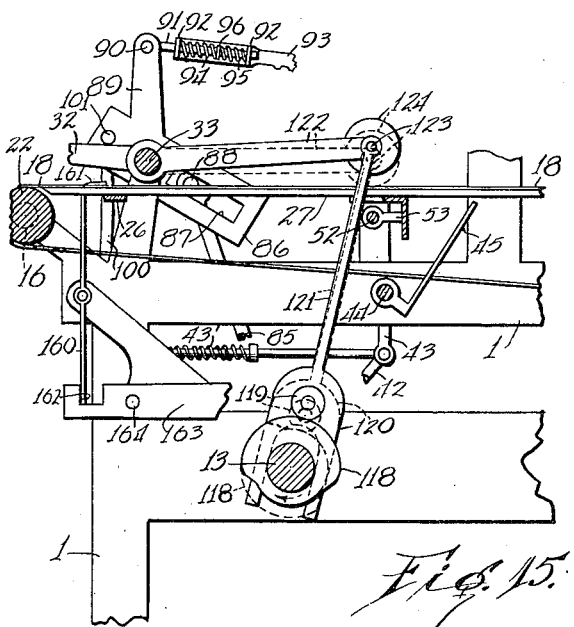
Fig. 15.
Fig. 18.
INVENTOR
F. E. Rickard
D. R. Robinson
BY
ATTORNEYS Patented Nov. 14, 1922.

1,435,334

UNITED STATES PATENT OFFICE.

FAY EBEN RICKARD AND DONALD RICHARD ROBINSON, OF CHICAGO, ILLINOIS; SAID ROBINSON ASSIGNOR TO ROSE MARY ROBINSON, OF CHICAGO, ILLINOIS.

SEALING MACHINE.

Application filed June 27, 1921. Serial No. 480,900.

*To all whom it may concern:*

Be it known that we, FAY E. RICKARD and DONALD R. ROBINSON, both citizens of the United States, and residents of the city of Chicago, in the county of Cook and State of Illinois, have invented a new and useful Improvement in Sealing Machines, of which the following is a full, clear, and exact description.

Our invention relates to sealing machines, and it consists in the combinations, constructions and arrangements herein described and claimed.

An object of our invention is to provide a device by means of which pamphlets, circulars, booklets, and similar articles may be accurately and effectively sealed at a minimum expense.

A further object of our invention is to provide a sealing machine in which the seals are taken one by one from a receptacle, moistened and applied to the edge of the pamphlet or folder, then bent over and pressed so as to seal the pamphlet securely.

A further object of our invention is to provide means for preventing the delivery of a seal in case there should be no booklet or folder ready to receive it; in other words, providing mechanism for operating only when there is material to operate on.

A further object of our invention is to provide means for automatically positioning the articles to be sealed so that each article is sealed in substantially the same place.

A further object of our invention is to provide a novel pneumatic mechanism in which a sucker head removes the seals successively, wets them, and transfers them to the article, the sucker head being mounted on a shaft which has a movement bodily as well as a rotative movement, novel means being provided for guiding the shaft in its bodily movement.

A further object of our invention is to provide a novel form of means for bending the seals over the edge of the article to be sealed.

A further object of our invention is to provide a novel form of control mechanism for controlling the movement of the shaft which bears the sucker head.

Other objects and advantages will appear in the following specification, and the novel features of the invention will be particularly pointed out in the appended claims.

Our invention is illustrated in the accompanying drawings, forming part of this application, in which—

Figure 1:
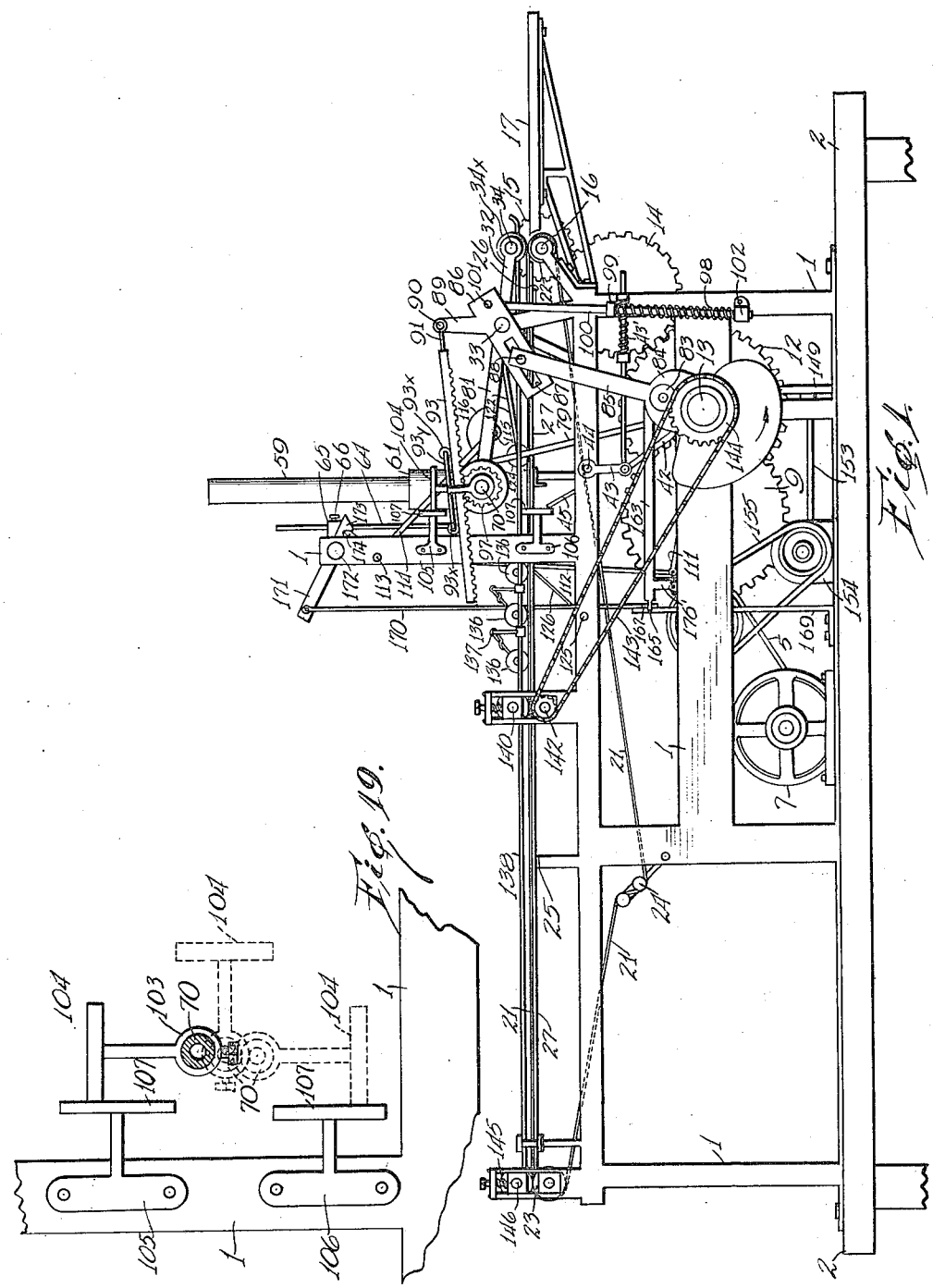
Figure 1 is a side elevation of the device.
Figure 2:
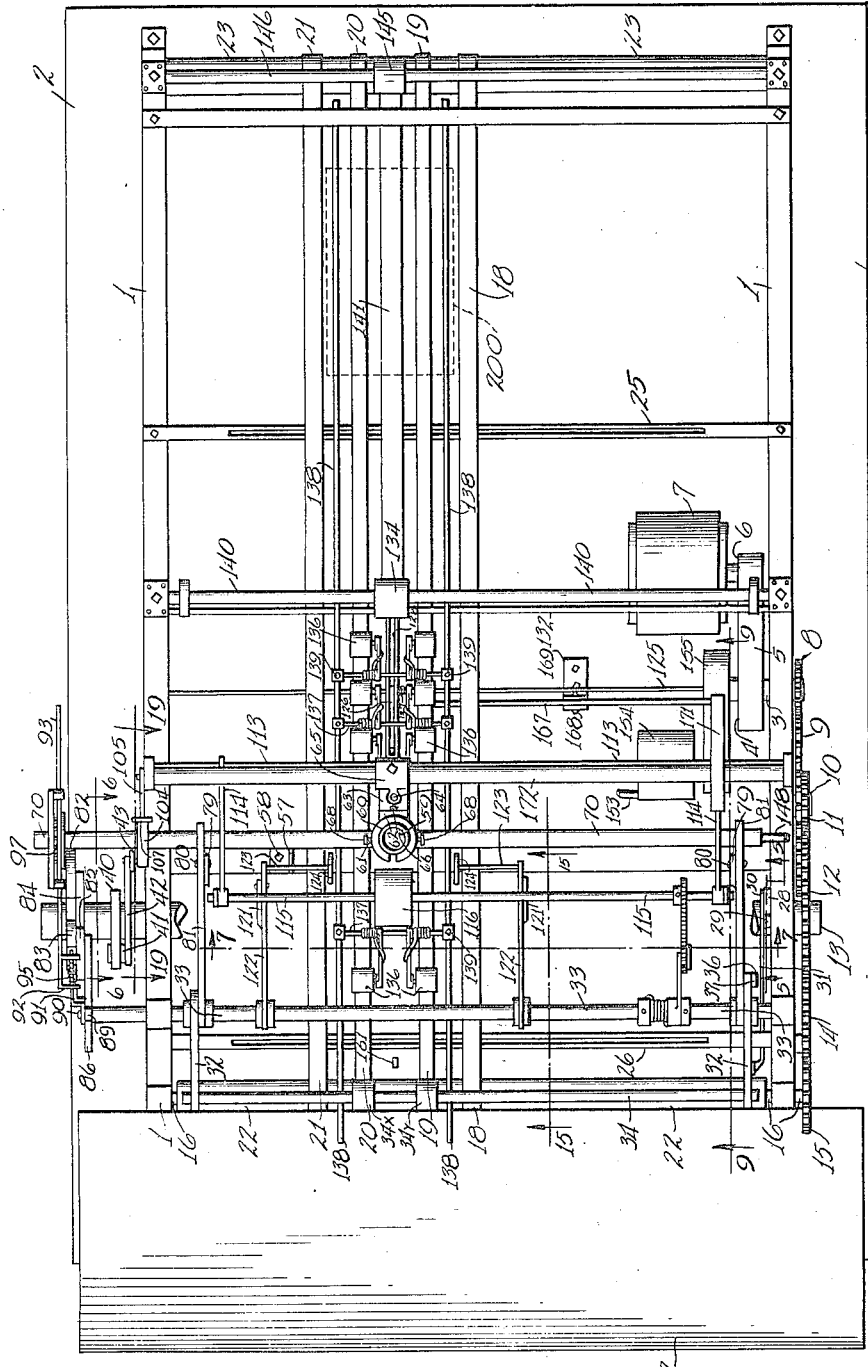
Figure 2 is a top plan view of the device.
Figure 3:
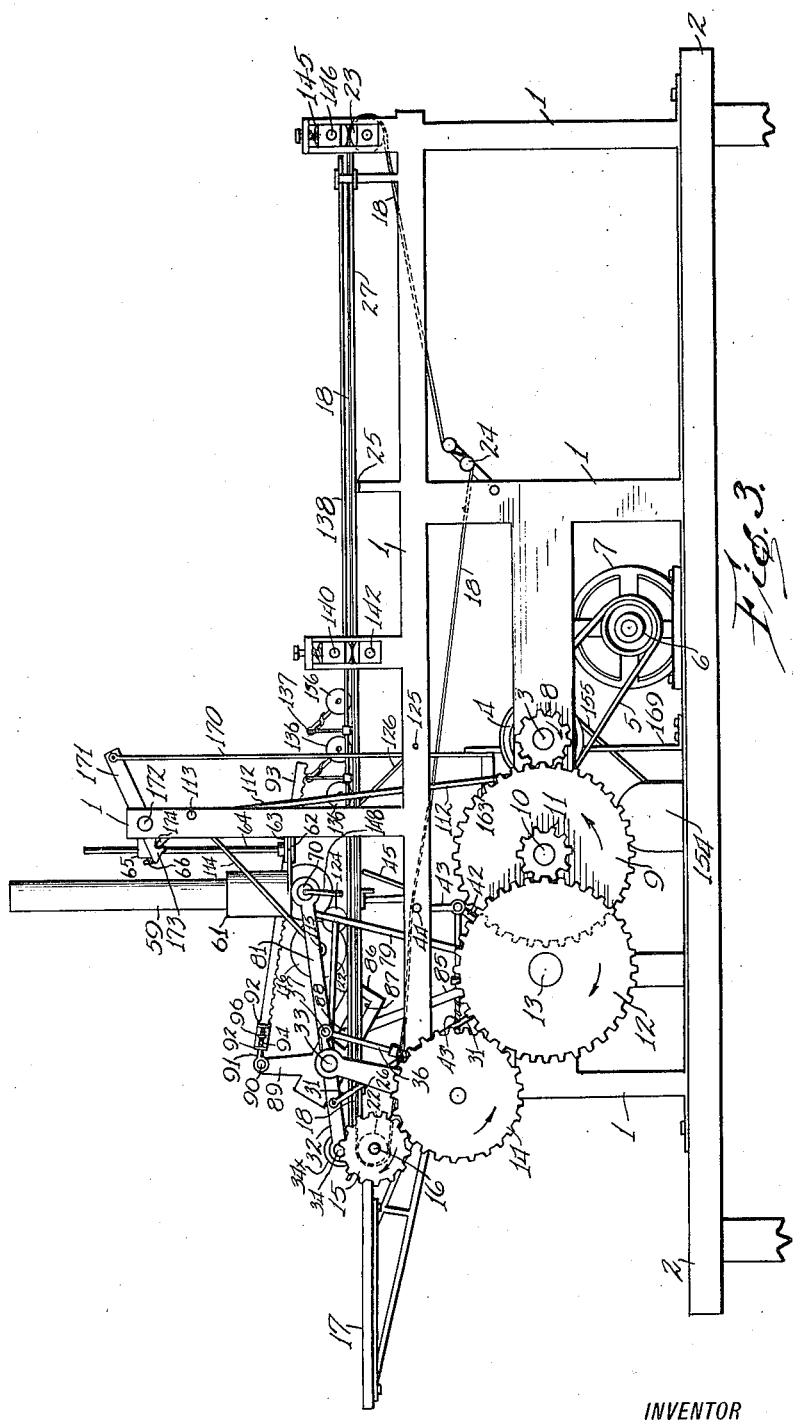
Figure 4:
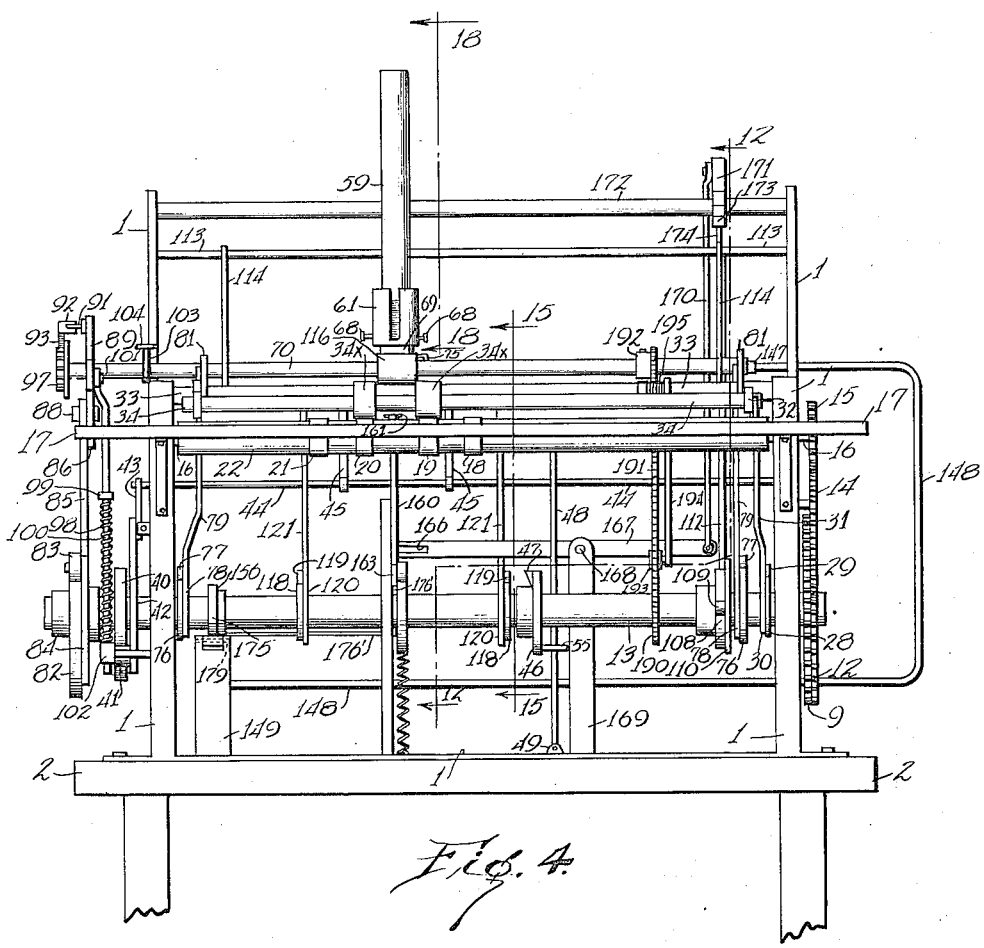
Figures 8, 9:
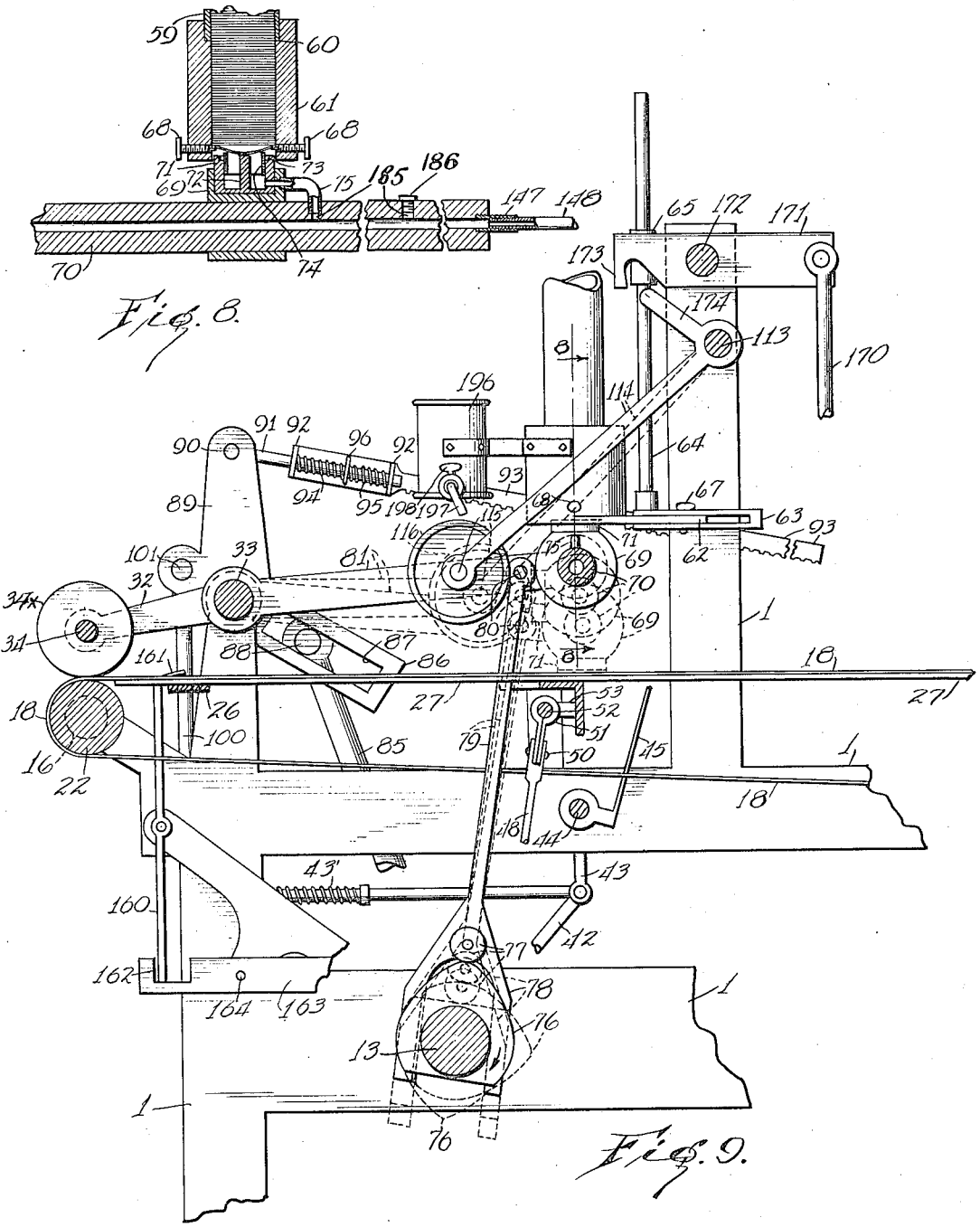

Figure 3 is a side elevation of the opposite side of the device from that shown in Figure 1, Figure 4 is a front elevation of the device, Figure 5 is a section along the line 5—5 of Figure 2, Figure 6 is a section along the line 6—6 of Figure 2, Figure 7 is a section along the line 7—7 of Figure 2, Figure 8 is a section along the line 8—8 of Figure 9, Figure 9 is a section along the line 9—9 of Figure 2, Figure 10 is an enlarged view of a portion of the device, Figure 11 is a section along the line 11—11 of Figure 7, Figure 12 is a section along the line 12—12 of Figure 4, Figure 13 is a section along the line 13—13 of Figure 7, Figure 14 is a section along the line 14—14 of Figure 13, Figure 15 is a section taken along the line 15—15 of Figure 2, Figure 16 is a section taken along the line 16—16 of Figure 12, Figure 17 is an enlarged view of a portion of the device, Figure 18 is a section taken along the line 18—18 of Figure 4, and Figure 19 is a section along the line 19—19 of Figure 2.

Referring now particularly to Figure 3, we have shown therein a frame 1 which is preferably mounted on a table top 2, but which may be mounted in any suitable manner. Mounted for rotation in the frame is a shaft 3, upon which is mounted a drive pulley or wheel, driven preferably by means of a belt 5 from the drive wheel 6 of an electric motor 7. The shaft 3 bears a gear 8 in mesh with a gear 9 on a shaft 10. The latter shaft bears a gear 11 which meshes with a gear 12 on a cam shaft 13. The gear 12 is in mesh with a gear 14 which, in turn, drives a gear 15 on a shaft 16. At one end of the frame is a table or shelf 17, upon which the stock is placed preparatory to feeding it through the machine to carry out the sealing operation.

Extending from the table 17 to the opposite end of the device are four endless belts or tapes, as shown at 18, 19, 20 and 21 in Figure 2. These tapes or bands are passed around a roller 22 at the forward end of the table adjacent to the table or shelf 17, and at the other end of the device they pass around a roller 23. The roller 22 is on the shaft 16 and is driven positively by the gear 15, so that the travel of the tapes is continuous. Each tape or band passes downwardly from the roller 23 and around a suitable slack take up device 24, such as that shown in Figure 3, so that the tapes, if sufficient tension is put thereon, are moved uniformly. Each tape passes above a bar which is of substantially the same width as the tape, but which forms a rigid support therefor. The bars extend longitudinal and are supported on cross rods 25 and 26 (see Figure 2), each of these rods being slotted, and the bars being secured to the rods by any suitable means, such as set screws (not shown) which will permit their lateral bodily movement, so that the bars may be set at different distances apart, and the tapes may be shifted laterally on the rollers to accommodate booklets or folders of varying sizes. One of these supporting bars is shown in Figure 3 at 27, and it will be observed that it extends underneath the tape or band 18.

The mechanism for feeding the booklets or other matter to be sealed is best shown in detail in Figure 5. In this figure, it will be observed that the cam shaft 13 bears a cam 28 arranged to engage a cam roller 29 carried by a slidable yoke 30 which is pivotally connected by a rod 31 with an arm 32. The latter is keyed to a shaft 33. A pair of arms 32 bears a shaft 34, having rollers 34$^x$ and 34$^y$, which are arranged to contact with the tapes 19 and 20 respectively immediately above the drive roller 22, when the apparatus is in the position shown in Figure 5. The rollers 34$^x$ and 34$^y$ are held in this position by means of a spring 35 on a rod 36 which is pivotally connected at 37 with the arm 32. As will be seen, the spring 35 bears at one end on a collar 38 on the rod 36, and at the other end on a lug 39 which is secured to the frame 1. The rod 36 is slidable in the lug 39, so that when the cam 28 revolves in a position to force the roller 29 away, it will raise the roller into the dotted line position, and the spring 35 will be compressed. When the cam rotates so as to permit the roller 29 to return, the spring 35 will swing the arm and its roller 34 downwardly into the position shown in Figure 5, in which position a booklet or folder, fed in between the rollers 34$^x$ and 34$^y$ and the tape 18, will be carried forwardly on the tape.

The mechanism for causing the booklet or folder to stop, preparatory to affixing the seal, is best shown in Figure 6. In Figure 6 it will be seen that the cam shaft 13 has a cam 40 which engages a cam roller 41 on a yoke 42, which is connected with a rock arm 43 attached to a rocker shaft 44. The latter bears two fingers or arms 45, which in the forward position of the machine, i. e., in the full line position shown in Figure 6, lies below the tapes or bands, but which are adapted to be swung up from the full line position shown in Figure 1 to the dotted line position, in which case they project far enough above the tape or belt to be engaged by the traveling booklet, thus causing the latter to remain stationary, even though the belt is moving continually. It may sometimes happen that one booklet or folder is run into the machine at a different position from the others, and in order to bring the booklets to a position where the seal, when applied, will be in substantially the same place on each booklet or folder, we provide the adjusting or positioning mechanism best shown in Figure 7. In this figure, it will be observed that the cam-shaft 13 is provided with a cam 46 having a portion 47 which is curved away from the general plane of the cam in a direction parallel with the cam shaft. A rocker-arm 48 is pivoted at 49 and has a sliding engagement at 50 with a block 51, which is rigidly secured to a slidable rod 52. The latter is parallel to the cam shaft 13 and is arranged to slide in supports 53. A spring 54 tends to force the rod to the left, in Figure 7. It is prevented from movement to the left by the engagement of the cam member 55, on the arm 48, with the cam 46, except when the portion 47 is revolved to a position to be engaged by the member 55, when the member 55 will move to follow the cam, by reason of the spring 54. This will permit the longitudinal movement of the rod 52. The latter bears a finger or arm 56 which will engage the booklet or folder and push it toward the left in Figure 1, but against an adjustable stop member 57 on the opposite side, the position of which may be determined by means of a set screw 58. This brings the booklet into the proper position for receiving the seal, and it insures that each booklet will have the seal placed substantially in the same relative position.

The seals are held in a receptacle 59, being stacked one upon the other in horizontal position. As many of these seals are provided as desired. This receptacle 59 is, in fact, a tube which may be charged with the seals, and the lower open end placed in a socket 60 in the magazine 61 (see Figure 8). The magazine 61 is carried by a plate 62 (see Figure 18), which enters a U-shaped clamping member 63 carried by a rod 64.

The latter is slidable in a support 65, and may be adjusted vertically and then clamped to the support by means of a set screw 66. The magazine may be moved laterally, i. e., horizontally, and clamped in adjusted position by means of a set screw 67, so that the position of the magazine may be accurately gauged with respect to the sucker head, hereinafter described. In order to support the seals within the magazine 61 and the container 59, we provide the screws 68 (see Figure 8). The ends of these screws have pin points which extend underneath the lowermost seal far enough to support the latter and the seal above it, but not far enough to prevent the ready withdrawal of the lowermost seal by bending the seal at the center in the act of withdrawing it pneumatically.

Mechanism for withdrawing the seals successively comprises a sucker head which we have shown in general at 69. This includes a sleeve-like body portion which is mounted on a hollow shaft 70 (see Figure 8). A cylindrical recess is provided in the body portion on one side of the shaft, into which a resilient cylinder 71, preferably of rubber, is disposed. The cylinder has a central base 72 (see Figures 8 and 17), and is provided with an annular recess 73, as shown in Figure 17. Within the cylinder 71 is disposed a soft rubber tube or nipple 74 which is held securely to the sides of the cylinder 71. As will be seen from Figure 8, the hollow pipe 70 communicates by means of a tube 75 with the interior of the cylinder 71, so that when air is exhausted from the tube 75, the interior of the cylinder 71 will be exhausted. The latter is adapted to enter the lower end of the magazine 61 (see Figure 8), so that pressure is withdrawn from the bottom seal of the stack. This seal is drawn downwardly until it engages the central post 72 and edges of the soft cylindrical member 74. The seal is held thus by suction, so that when the sucker head is moved away from the magazine, the lowermost seal will be pulled with it, whereupon the next succeeding seal will move downwardly to rest upon the pin points of the screws 68. The mechanism for drawing the air from the hollow pipe 70 will be explained hereinafter.

Having shown how the sucker head extracts the seal from the magazine, we will now explain how the shaft 70 bearing the sucker head is moved downwardly. Consider now Figure 9. In this figure the cam shaft 13 is provided with a pair of cams 76, each of which is arranged to engage a roller 77 carried by a yoke 78, having an arm 79 which is pivotally connected at 80 with a rock arm 81. The latter is loosely mounted on the shaft 33, and bears at its forward end the hollow shaft or rod 70, which is journalled to turn therein. As will be seen from Figure 2, these arms 81 are separated to give a long bearing for the hollow rod or shaft 70. It will be obvious that when the cam shaft is in the position shown in Figure 9, the cams 76 will have raised the rollers 77 so as to bring the arms 81 to their uppermost position, in which position the sucker head 69 is in engagement with the bottom seal of the magazine. On the further rotation of the cam shaft, the rollers 77 will follow the cams 76, and the arms 81 bearing the hollow rod 70 and the sucker head 69 will move downwardly from the full line position shown in Figure 9 to the dotted line position.

During the downward movement of the sucker head, the hollow rod 70, bearing the sucker head, is rotated. The mechanism for doing this is best shown in Figure 10. In this figure the cam shaft 13 bears a cam 82, arranged to engage a roller 83 on a yoke 84, which is connected by means of an arm 85 with the arm 86 of a bell-crank lever. It will be observed that the bell-crank lever has a slot 87, and that there is a pin 88 at the end of the arm 85, which permits a pivotal and, at the same time, a sliding connection with the bell-crank lever. The latter is loosely pivoted on the shaft 33, and the opposite end 89 is pivotally connected at 90 with a rod 91. The latter is slidably disposed in the outwardly turned lugs 92 on the shank of the rack 93 (see Figures 10 and 9). Springs 94 and 95 bear on the lugs 92 and on the centrally disposed collar 96 carried by the rod 91. This forms a yieldable connection with the rack bar 93. The latter engages a gear 97 carried by the end of the hollow rod or shaft 70 (see Figure 4), so that when the rack is moved by the bell-crank lever, the hollow shaft 70 is turned. The rack 93 is kept in constant engagement with the gear 97 by means of rollers 93$^x$ at the end of a T-shaped member 93$^y$, which is loosely secured to the end of the shaft 70, as shown in Figure 1. In the position of the device shown in Figure 10, the cam roller 83 is as near the center of the cam shaft 13 as it can get. A spring 98 bears on a collar 99 carried by a rod 100, which is connected at 101 with the bell-crank lever. The opposite end of this spring bears on a lug 102 secured to the frame 1 (see Figure 1). The bell-crank lever is thus held in position to bring the hollow shaft 70 and its sucker head to the uppermost position, i. e., that shown in Figures 4, 8 and 9. When, however, the cam shaft 13 has moved farther, then the roller 83 in Figure 10 will be pushed upwardly, and the bell-crank lever will be swung from its full line position in Figure 10 to its dotted line position, thus rotating the hollow shaft 70 and carrying the sucker head from the upper side of the shaft to the lower side.

In order to limit the rotation of the hollow shaft 70 and the sucker head exactly 180°, so as to bring the sucker head into accurate alinement with the magazine, when the sucker head is withdrawing the seal, and also to bring the end of the sucker head into parallelism with the booklet or folder when the sucker head is applying the seal, we arrange the mechanism shown in Figure 19. In this figure it will be observed that the shaft 70 is provided with a sleeve 103 having a T-shaped member 104 secured thereto. Carried by the frame 1 are brackets 105 and 106, each having a stop member 107 so positioned that it will be engaged by the member 104 to limit the rotative movement of the shaft 70. As stated before, the rotation of the shaft 70 is caused through the medium of the rack 93. Spring connection of the rack 93 with the rod 91 permits the member 104 to be brought firmly against the stop members 107.

It should be noted that the action of the sucker head, after a seal is first detached from the magazine, is first a downward movement, then a rotative movement, and then a further downward movement. During the rotative movement, the gummed side of the seal is moistened by the apparatus shown in Figure 11. In this figure the cam shaft 13 is provided with a cam 108 arranged to engage a roller 109 on a yoke 110, which is pivotally connected by a rod 111 to an arm 112. The latter is rigidly connected with a rock shaft 113 which has rigidly attached thereto arms 114 (see Figures 11 and 2), bearing a shaft 115 at their outer extremities. This shaft is provided with a wetting roller 116 which may be made of any suitable material adapted to retain water, such as a fabric covered roller. In Figure 11, the cam 108 is shown in position to permit the yoke to be pulled forward by means of a spring 117 fastened at the end of the arm 112 at one end, and at the other end to any suitable point (not shown) on the frame. This brings the wetting roller 116 down in position to be engaged by the seal, which is carried by the sucker head 69 as the latter is being rotated. The wetting roller thus wipes the gummed face of the seal and moistens it, preparatory to the attachment of the seal to the booklet or folder. The cam 108 is arranged so that when the sucker head again moves upwardly, the wetting roller 116 is swung from the full line position to the dotted line position shown in Figure 11, so that the roller is out of the way of the sucker head. The sucker head continues in this downward movement, and presses the seal on the folder or booklet, one-half of the seal projecting over the forward edge thereof. The pressure exerted by the sucker head causes the rubber cylinder 71 (see Figure 17) to be slightly compressed, and it causes the soft rubber sleeve or cylinder 74 to be flared outwardly into the recess 73. This insures a firm pressure so as to bring the seal into intimate contact with the booklet. At this point the vacuum is released by means described later, and the action of the cam 76 causes the upward movement of the hollow shaft 70 and the sucker head 69.

After the sucker head has started upwardly, the cam 40 (see Figure 6), which controls the stops 45, operates to withdraw them below the belts or tapes, thereby permitting the booklet to be carried forwardly upon the tapes. In order to insure the immediate starting of the booklet, we may provide the mechanism shown in Figure 15. In this figure, the cam shaft 13 has a cam 118, arranged to engage a cam roller 119 on a yoke 120, connected by an extension 121 with an arm 122, loosely mounted on the shaft 33. The arm 122 has a stub shaft 123, at the end of which is a roller 124. Normally, that is to say, during the greater period of the cycle of operations, this roller 124 is kept in upward position by means of a cam, but it is arranged to be lowered in the dotted line position just after the stops 45 have been retracted, so as to press the booklet down upon the tapes or bands, thereby insuring frictional engagement with the latter, so that the inertia of the booklet is immediately overcome, and it starts forward quickly. In practice, we make use of two rollers which are operated in the manner described before, and which are shown in Figure 2, the rollers being spaced apart so as to provide means for engaging the booklet on opposite sides of the center.

The bending of the seal over the edge of the booklet is accomplished by the mechanism shown in Figures 12, 16 and 17. In Figure 12 it will be noted that there is a shaft 125 which extends transversely with respect to the frame. This shaft has fixedly mounted thereon an arm 126. The shaft 125 is rotatable in the frame in suitable bearings, and the arm is normally held by a spring 127 in the normal position, i. e., in the position shown in full lines in Figures 12 and 16. The arm 126 projects through a slot 128 in a guide strip 129. The latter is held at its forward end (see Figure 17) above the endless tapes, by means of depending pins 130 carried by a bar 131 which extends transversely of the machine. At the rear end, the guide strip 129 is held by a transverse bar 132. The forward end of the guide strip is bent up, as shown at 133 in Figure 17. When the booklet, with the seal attached and projecting over the front edge, as shown in Figure 17, reaches the arm 126, the seal will engage the arm and will be bent downwardly. The edge of the booklet pushing against the arm will carry it from the full line position, shown in Figures 12 and 17, to the dotted line position, and during this time the seal will have been bent by the arm around the forward edge and up against the underside of the booklet. Immediately thereafter the seal passes between the two rollers 134 and 135 (see Figure 17), these rollers pressing the seal so as to cause it to adhere firmly.

In order to insure that the booklet is pressed down firmly on the face at such time as it is desired to have a forward movement of the booklet, we provide spring-pressed rollers, such as those shown at 136 in Figures 1 and 2. The rollers, as will be observed, are arranged in pairs, and are mounted on transverse rods 137 adjustably carried on longitudinal rods 138 (see Figure 2), the construction being such that the rollers may be shifted longitudinally with respect to the device, and may be secured in position by tightening the set screws 139. In Figure 2, it will be seen that one pair of rollers is disposed in front of the sucker head and that three pairs are disposed between the sucker head and the pressing roller 134. The latter roller is mounted on a shaft 140 which extends transversely with respect to the machine.

The roller 135 which is underneath the roller 134 has an endless band or tape 141 which passes over the roller 23. The purpose of this extra tape is to prevent the seal from opening after it has been pressed. The roller 135 is on a shaft 142 which is journalled in the frame, and which is positively driven by means of a sprocket connection 143 with a sprocket gear 144 on the cam shaft 13 (see Figure 1). At the end of the machine is a roller 145 on a shaft 146 which again presses the seal, after which the sealed booklet is delivered from the machine to any suitable receptacle.

We will now explain the means by which the air in the hollow shaft 70 is exhausted to create a vacuum for the purpose of detaching the seal. In Figure 8 it will be observed that at one end of the hollow shaft 70 is a short tube 147 arranged to receive a flexible tubing 148. The latter, as will be seen by Figure 4, extends downwardly to the valve casing 149. The casing contains a valve 150 (see Figure 13) which normally closes an opening 151 leading from the outer atmosphere to the interior of the valve casing, the valve being held in its normally closed position by means of a spring 152. On the opposite side of the valve casing is a pipe 153 which leads to a vacuum pump 154 of any suitable type, (see Figures 1 and 3). The pump may be driven by means of a belt 155 from the shaft 3, or in any other suitable manner. This pump is driven continuously to pump air, but as long as the valve 150 is open, is ineffective in exhausting the air from the interior of the shaft 70. When, however, this valve 150 is closed, then the pump operates directly on the interior of the shaft to withdraw air therefrom. The means for opening the valve is shown in Figure 13. It comprises a cam 156 on the cam shaft 13 (see Figure 13), which engages one end of the valve 150 during the revolution of the cam shaft to open the valve when the machine is in normal operation.

The opening of this valve occurs immediately after the sucker head has deposited the seal upon the booklet. The vacuum then is broken, and the seal remains on the booklet while the sucker head moves upwardly, as stated. Immediately thereafter the valve 150 closes, thereby drawing in air through the sucker head. When the latter reaches the upper end of its movement, it sucks the lowermost seal of the magazine downwardly and holds it there in the manner described.

We have spoken thus far of the normal operation of the device, that is to say, of the manner in which the device operates when the booklets are being fed into the machine as fast as it will operate. If for any reason the feeding of the booklets into the machine should be suspended, then the sucker head is automatically prevented from withdrawing the seals, and the wetting roller is automatically prevented from engaging the sucker head by a lockout mechanism, which is best shown in Figures 7 and 12. In these figures it will be observed that at the forward end of the machine is disposed a pivoted arm 160, the upper end of which projects slightly above the endless bands, this end being bent horizontally to form a head 161. The lower end of this arm is arranged to extend into a recess 162 in a lever 163 which is pivoted at 164, and whose opposite end is provided with a pin 165 arranged to extend to the forked end 166 of a lever 167, which is pivoted at 168 (see Figure 7), on a bracket 169, this lever being pivotally connected by means of the vertically extending rod 170. A latch-member 171, which is pivoted at 172 and which is provided with a hook-like projection 173, is arranged to engage a finger 174, which is rigidly carried by the shaft 113 (see also Figure 11). When the machine is in operation, but no booklets are being fed in, then the apparatus is in the position shown in Figure 12, in which figure the finger 174 is held by the latch, so that the wetting roller will not be permitted to move to its dotted line position to engage the sucker head. The cam shaft 13 is provided with a cam 175 arranged to engage a roller 176 on the lever 163 to raise the latter at each revolution of the cam shaft. The raising of this lever will raise the latch 171 at each revolution of the cam shaft through the medium of the lever 167 and the rod 170. In other words, it will release the finger 174 at every revolution of the cam shaft.

We have explained before how, by the mechanism shown in Figure 11, the wetting roller is lowered to engage the seal carried by the sucker head, the lowering of the wetting roller being governed by the cam 108. The latching mechanism, however, if in the position shown in Figure 12, will prevent the wetting roller from engaging the sucker head. The cam 108 and the cam 175 work alternately, and the wetting roller can only move downwardly to engage the seal to wet it, if the latch 171 is raised to free the finger 174, when the cam 108 has moved to permit the downward movement of the wetting roller. As long as no booklets are being fed in, the latch 171 will engage the finger 174 to prevent the downward movement of the wetting roller. When, however, a booklet is fed in, it will engage the arm 160 and at the first upward movement of the lever 163 by the cam roller 176, the arm 160 will assume the dotted line position shown in Figure 12, being swung to engage the end of the lever 163 to lock it in the upper position. This throws the latch 171 into the releasing position shown in dotted lines in Figure 12. When, now, the cam 108 moves into the position shown in Figure 11, the wetting roller will be swung downwardly and will engage the seal at the time that the sucker head is in the position midway between the upper and lower end of its stroke.

In Figure 13 it will be observed that the lever 163 has a lateral extension 176' which extends downwardly and then laterally, as shown in Figure 14, above an arm 177. The latter is connected with a plate 178 which is hinged at 179, and which is provided with a slot 180 arranged to receive the upper spherical head of the valve 150. On the other side of the plate are two lugs 181 which are arranged to engage pins 182 carried by the valve head 150.

When no booklets are being fed into the machine, but when the latter is running, the spring 183 will pull the lever 163 downwardly at each revolution of the cam 175, so that the extension 176 will engage the arm 177, thereby forcing the plate 180 downwardly and releasing the vacuum at the time when the sucker head is in position to extract a seal. Since there is no suction to effect this extraction, as long as the lever 163 is permitted to move downwardly, then the sucker head will merely move idly, without extracting the seal. When the booklet is fed into the machine, however, and the arm 160 locks out the lever 163, i. e., raises it so that its cam roller 176 will not follow the cam, then the arm 177 and the plate 178 will be lifted, together with the valve 150, by the spring on the latter, thus permitting the valve to close, so that the latter will then be controlled only by the revolution of the cam 156. The vacuum then will be on the sucker head at all times, except when the cam 156 releases it, just after the sucker head has deposited the seal.

The wetting roller 116 is driven positively by means of a sprocket wheel 190 on the shaft 13 (see Figure 11). A sprocket chain 191 runs over this sprocket wheel, thence over a sprocket wheel 192 secured to the roller 116, thence over an idler 193. The latter is on an arm 194 loosely mounted on the shaft 33. A spring 195 on the shaft 33 tends to swing the arm so as to keep the chain 191 taut. When, however, the wetting roller 116 is raised into the dotted line position, the chain 191 will be moved to the dotted line position, and so will the roller 193 and the arm 194. When the wetting roller moves downwardly into its full line position, shown in Figure 11, the spring will move the roller 193 to keep the chain taut.

The wetting roller 116 is kept moistened by means of a reservoir 196, having a spout 197 regulated by a cock 198.

From the foregoing description of the various parts of the device, it will be evident that by the use of this mechanism booklets may be fed in at one end of the machine, the seals will be affixed, bent over the edge, and pressed down and delivered at the opposite end of the machine. As heretofore stated, the seals will be extracted one at a time, then moistened and applied. The extraction of the seals is dependent upon the presence of booklets in the machine. If, for any reason, the feeding of the booklets into the machine is suspended, then the operation of extracting the seals and the wetting them is automatically suspended by the mechanism described. All the cams are shaped to operate in such a manner as to time the movement accurately. This permits the mechanism to operate at a very high rate, and it results in the economical sealing of matter in a manner which could not possibly be effected by hand. It will also be observed that there is a very small chance for anything to get out of order. The rods 138 have their forward ends bent upwardly, as shown in Figure 1. Any booklet of a thickness to enter between the rods 138 and the endless tapes may be sealed by the apparatus. The ends of the rods 138, however, will prevent any thicker booklet or pamphlet from entering the machine, and consequently it cannot be injured by the passing of an unduly thick booklet or pamphlet therethrough, either accidentally or with malicious intent.

There is one thing to which we desire to call particular attention. It will be observed that the machine is of sufficient width (see Figure 2) to permit the installation of a plurality of seal holding receptacles, sucker heads, wetting rollers, seal benders, pressing rollers, etc., which may be operated simultaneously by mechanism already described in connection with the statement of the operation of the one set of sealing devices shown. To this end, the hollow shaft 70 is provided with openings 185 which may be closed by screw plugs 186 (see Figure 8), these screw plugs being removed for affording communication between the hollow shaft and any additional sucker heads which may be placed therein. Similarly, the rod 115 (see Figure 2) may bear additional wetting rollers; the rod 140, additional pressing rollers. In this way the capacity of the machine may be greatly increased, without the necessity of supplying entirely new machines.

We have disclosed and illustrated a particular form of means for sealing booklets. It is obvious, however, that the device could be used for attaching gummed sheets of any kind to various articles. Thus stamps may readily be applied by the mechanism illustrated. The use of the term "gummed sheets" in the claims is therefore designed to include any such articles as stamps, seals, labels, etc., which might be applied with the mechanism above described.

It will also be obvious that by adjusting the fingers 45 so that they will stop the booklet at any predetermined position with respect to the sucker head 69, the seal can be affixed to the booklet or folded sheet at any desired place thereon.

A heating means 200, such as that shown diagrammatically in Figure 2, can be disposed between the presser rollers 134 and 145. The seals can therefore be thoroughly dried before they leave the machine.

It will be understood that the description of the specific form of the device disclosed is merely illustrative of one of the many forms of this device which might be made, without departing from the spirit and the scope of the appended claims.

We claim:

1. In a sealing device, a frame, means mounted on the frame for transporting booklets from one portion of the frame to another, means for bringing the booklets to rest successively while the transporting means is in operation, means for transporting seals one at a time toward the booklet in its position of rest and for applying it to the booklet, said seal transporting means applying the seals to the booklets so that a portion thereof projects beyond the edge of the booklet, means for wetting the gummed face of each seal during its transportation toward the booklet, means for releasing the booklet and permitting it to be moved by the booklet-transporting means, and means for subsequently pressing the seal to cause it to adhere to the booklet.

2. In a sealing device, a frame, an endless band carried by the frame for transporting booklets, a stop member arranged to be engaged by each booklet during its travel on the endless band whereby the booklet is brought to rest, means for applying a seal to the booklet during its period of rest, said means applying said seal so that a portion thereof projects beyond the edge of the booklet, and means for withdrawing the stop member after the seal is applied to permit the booklet to move forwardly on the band.

3. In a device of the type described, a frame, an endless band carried thereby for transporting booklets, a stop member, means for interposing the stop member in the path of the booklet to bring the latter to rest, means for applying the seal to the booklet when the latter is at rest, said second named means applying said seal so that a portion thereof projects beyond the edge of the booklet, means for subsequently causing the withdrawal of the stop member, and means for pressing the attached seal to cause its adherence to the booklet.

4. In a device of the type described, a frame, an endless band carried by the frame for transporting booklets, means for bringing the booklets successively to a stop irrespective of the movement of the band, a magazine for containing a plurality of gummed seals, pneumatic means for removing one seal at a time and for applying the seals to the booklets successively in such a position that a portion of the seal projects beyond the edge of the booklet, and a movable finger for engaging the seal to bend it around the edge of the booklet.

5. In a device of the type described, a frame, means for transporting articles along said frame, means for applying gummed sheets to said articles at a point to permit the gummed sheet to project over the edge of the article, and means for subsequently bending the sheet over the edge of the article, said last named means comprising a movable arm or finger arranged to engage the projecting end of the sheet, said arm being normally inclined with respect to the plane of the projecting portion at the moment the projecting portion engages the arm, whereby the projecting portion is bent.

6. In a device of the type described, a frame, means for transporting articles along said frame, means for applying gummed sheets to said articles at a point to permit the gummed sheet to project over the edge of the article, and means for subsequently bending the sheet over the edge of the article, said last named means comprising an arm or finger pivoted on an axis out of the plane of the projecting portion and being normally inclined to the plane of the projecting portion, said arm being engaged by the projecting portion and being moved from its inclined position to an inclined position on the opposite side of a vertical plane through its pivotal axis.

7. In a device of the type described, a frame, means for transporting articles along said frame, means for applying gummed sheets to said articles at a point to permit the gummed sheet to project over the edge of the article, means for subsequently bending the sheet over the edge of the article, said last named means comprising an arm or finger pivoted on an axis out of the plane of the projecting portion and being normally inclined to the plane of the projecting portion, said arm being engaged by the projecting portion and being moved from its inclined position to an inclined position on the opposite side of a vertical plane through its pivotal axis, and a plate having a guide slot for receiving the pivoted arm.

8. In a device of the type described, a frame, means for transporting articles along said frame, means for applying gummed sheets to said articles at a point to permit the gummed sheet to project over the edge of the article, means for subsequently bending the sheet over the edge of the article, said last named means comprising an arm or finger pivoted on an axis out of the plane of the projecting portion and being normally inclined to the plane of the projecting portion, said arm being engaged by the projecting portion and being moved from its inclined position to an inclined position on the opposite side of a vertical plane through its pivotal axis, and a plate rigidly disposed above the path of said article and having a slot arranged to receive the end of the pivoted arm, said plate serving to maintain the article in a fixed plane while the sheet is being bent over the edge thereof.

9. A sheet bending device comprising a carrier for the sheet, means for moving the carrier, a pivoted arm inclined normally toward the moving sheet and arranged to be engaged by the latter to cause the bending of the sheet, the continued movement of the sheet causing the swinging of the arm out of the plane of the sheet and the wiping of the bent portion thereof against the body of the sheet.

10. A sheet bending device comprising a carrier for the sheet, means for moving the carrier, a pivoted arm inclined normally toward the moving sheet and arranged to be engaged by the latter to cause the bending of the sheet, the continued movement of the sheet causing the swinging of the arm out of the plane of the sheet and the wiping of the bent portion thereof against the body of the sheet, and means for holding the sheet to the carrier during the bending thereof.

11. In a device of the type described, a frame, means for transporting articles along the frame, a magazine for holding gummed sheets, means for extracting one of the gummed sheets from the magazine and applying it to the article, and means for moistening the gummed face of the sheet subsequent to its extraction from the magazine and prior to its application to the article, said moistening means being controlled by the movement of the article.

12. In a device of the type described, a frame, means for transporting articles along the frame, a magazine for holding gummed sheets, means for extracting one of the gummed sheets from the magazine and applying it to the article, and means for moistening the gummed face of the sheet subsequent to its extraction from the magazine and prior to its application to the article, said moistening means and said extracting means being controlled by the movement of the article.

13. In a device of the type described, a frame, means for transporting articles along the frame, a magazine for holding gummed sheets, means for extracting one of the gummed sheets and applying it to the article, means for moistening the gummed face of the sheet while it is being transported by the extracting means, a lock out mechanism for rendering the moistening means and the extracting means inoperative, and means for controlling the lock out mechanism through the movement of the article.

14. In a device of the type described, a frame, means for transporting articles along the frame, a magazine for holding gummed sheets, means for extracting one of the gummed sheets and applying it to the article, means for moistening the gummed face of the sheet while it is being transported by the extracting means, and means for automatically rendering said extracting means inoperative.

15. In a device of the type described, a frame, means for transporting articles along the frame, a magazine for holding gummed sheets, means for extracting one of the gummed sheets and applying it to the article, means for moistening the gummed face of the sheet while it is being transported by the extracting means, and means for automatically rendering said moistening means inoperative.

16. In a device of the type described, a frame, means for transporting articles along the frame, a magazine for holding gummed sheets, means for extracting one of the gummed sheets and applying it to the article, means for moistening the gummed face of the sheet while it is being transported by the extracting means, and means for automatically rendering the extracting means and the moistening means inoperative.

17. In a sealing device, a frame, movable endless bands carried thereby for transporting booklets, means for bringing the booklets to rest at a predetermined position, means for applying a seal to each booklet in a position to project over the edge thereof, and means for bending the seal around the edge of the booklet and for bringing it up against the underside of the booklet.

18. In a sealing device, a frame, movable endless bands carried thereby for transporting booklets, means for bringing the booklets to rest at a predetermined position, means for applying a seal to each booklet in a position to project over the edge thereof, means for bending the seal around the edge of the booklet and for bringing it up against the underside of the booklet, and means for pressing the bent seal on the upper and lower sides thereof.

19. In a sealing device, a frame, booklet transporting means, means for bringing the booklets to rest successively while the transporting means is in operation, means for wetting a seal and for applying it to the booklet in a position to project over the edge thereof, and means for bending the seal around the edge of the booklet and for bringing it up against the underside of the booklet.

20. In a sealing device, a frame, booklet transporting means, means for bringing the booklets to rest successively while the transporting means is in operation, means for wetting a seal and for applying it to the booklet in a position to project over the edge thereof, means for bending the seal around the edge of the booklet and for bringing it up against the underside of the booklet, and means for pressing the bent seal on the upper and lower sides thereof.

21. In a device of the type described, a receptacle for seals, means for bringing an article into registration with said receptacle, a pneumatic seal carrying member, means for reciprocating said member through an arc of 180°, means for preventing any further rotation of said member beyond an arc of 180°, and means for moving said member into engagement with the lowermost seal and for moving said member into engagement with the article, said member being adapted to enter the lower end of said magazine.

22. In a device of the type described, a receptacle for seals, means for bringing an article into registration with said receptacle, a pneumatic seal carrying member, means for reciprocating said member through an arc of 180°, means for preventing any further rotation of said member beyond an arc of 180°, and means for moving said member into engagement with the lowermost seal and for moving said member into engagement with the article, said member being rotated by said rotating means between its movements into engagement with the lowermost seal and into engagement with the article, said member being adapted to enter the lower end of said magazine.

23. In a device of the type described, a rod, a seal carrying member mounted on said rod, yielding means for rotating said rod through an arc of 180°, a pair of stop members, and a member carried by said rod and adapted to successively engage each of said stop members, whereby said rod is automatically prevented from moving through an arc greater than an arc of 180°.

24. In a device of the type described, a receptacle for seals, means for bringing an article into registration with said receptacle, a pneumatic seal carrying member, means for reciprocating said member through an arc of 180°, means for moving said member into engagement with the lowermost seal and for moving said member into engagement with the article, said last named means operating when said member is not rotating, and a wetter roller adapted to move into engagement with said member when said member is carrying a seal and is being rotated by said rotating means.

25. In a device of the type described, a receptacle for seals, means for bringing a booklet into registration with said receptacle, means for moving the booklet laterally with respect to said receptacle, a member adapted to transfer a seal from said receptacle to the booklet, whereby the seal will project over the edge of the booklet, and means for bending the extended portion of said seal into engagement with the opposite side of the booklet.

26. A sucker head comprising a body portion, a cylindrical semi-resilient member carried by said body, said member being provided with a bore and with a pin-shaped projection centrally disposed in the bore, the outer end of said pin being flush with the outer end of said cylinder, said cylinder having an annular recess communicating with the bore, and a resilient tube secured to the wall of the bore and having its outer end normally projecting beyond the end of said cylinder.

27. In a sealing device, a frame, means for applying a seal to a booklet, means for conveying a booklet to the sealing means, and adjustable means for positioning the booklet longitudinally and laterally with respect to said sealing means whereby said means is adapted to position various sized booklets.

28. In a sealing device, a frame, means for applying a seal to a booklet, means for conveying a booklet to the sealing means, intermittent means for disposing the booklets on the booklet moving means, and adjustable means for positioning the booklet longitudinally and laterally with respect to said sealing means whereby said means is adapted to position various sized booklets.

29. In a sealing device, a frame, a seal carrying magazine, a sucker head having a laterally projecting resilient seal carrying member adapted to enter said magazine, the end of said projection adapted to be entirely covered by a seal, a wetter roller, said wetter roller being adapted to engage with the end of said projection when said projection is carrying a seal.

30. In a sealing machine, a frame, a seal carrying cylindrical magazine supported by said frame, two diametrically opposed needles disposed in the lower end of said magazine and adapted to project a slight distance beyond the inner wall thereof, a plurality of seals disposed in said magazine and supported by said needle points, and a sucker head having a laterally projecting resilient seal carrying member adapted to enter the lower end of said cylinder and to engage with the lowermost seal.

31. In a sealing machine, a frame, a seal carrying magazine supported by said frame, means for conveying booklets to said magazine, a sucker head adapted to move into engagement with said magazine and the booklet, means for rotating said sucker head when disposed midway between said magazine and booklet, and a wetter roller adapted to engage with said sucker head during the rotative movement thereof and during its movement from said magazine to the booklet.

32. In a sealing machine, a frame, a seal carrying magazine supported by said frame, means for conveying booklets to said magazine, a sucker head adapted to move into engagement with said magazine and the booklet, means for rotating said sucker head when disposed midway between said magazine and booklet, a wetter roller adapted to engage with said sucker head during the rotative movement thereof and during its movement from said magazine to the booklet, and means disposed in the booklet conveying means and controlled by the booklets for throwing said wetter roller into inoperative position when a booklet is not in registration with said magazine.

33. In a sealing machine, a seal carrying magazine, means for conveying booklets into registration with said magazine, a sucker head adapted to convey a seal from said magazine to the booklet, means for drawing air into said sucker head when in engagement with said magazine, and means for making said last named means inoperative when a booklet is not in registration with said magazine, whereby a seal will not be extracted from said magazine.

34. In a sealing machine, a sucker head, a seal magazine, a wetter roller, means for moving said sucker head into said magazine and for bringing said head into engagement with said wetter roller, means for rotating said head through an arc of 180 degrees when in engagement with said roller, means for moving said head away from said magazine and into engagement with a booklet, and means for normally placing said head under vacuum and for releasing said vacuum only when said head is in engagement with the booklet.

FAY EBEN RICKARD.
DONALD RICHARD ROBINSON.